United States Patent Office 3,399,977
Patented Sept. 3, 1968

3,399,977
PROCESS FOR PROCESSING IRRADIATED
CERAMIC REACTOR FUELS
Joseph Gérard Wurm and Alessandro Avogadro, Varese,
Italy, assignors to European Atomic Energy Community—Euratom, Brussels, Belgium
Filed June 4, 1965, Ser. No. 461,342
Claims priority, application Germany, June 10, 1964,
E 27,195
8 Claims. (Cl. 23—325)

ABSTRACT OF THE DISCLOSURE

Irradiated ceramic reactor fuels, having an oxide base, are digested in a molten basic alkali compound such as sodium or potassium hydroxide or mixtures thereof, in the presence of air or an oxygen-releasing agent, at a temperature of 500–700° C. The insoluble alkali uranate precipitate is separated from the melt and after successive treatments with potassium pyrosulfate and ammonia, uranium oxide is recovered. The initial melt containing fissile by-products can be readily converted to insoluble solid materials for ultimate disposal.

Figure 1:
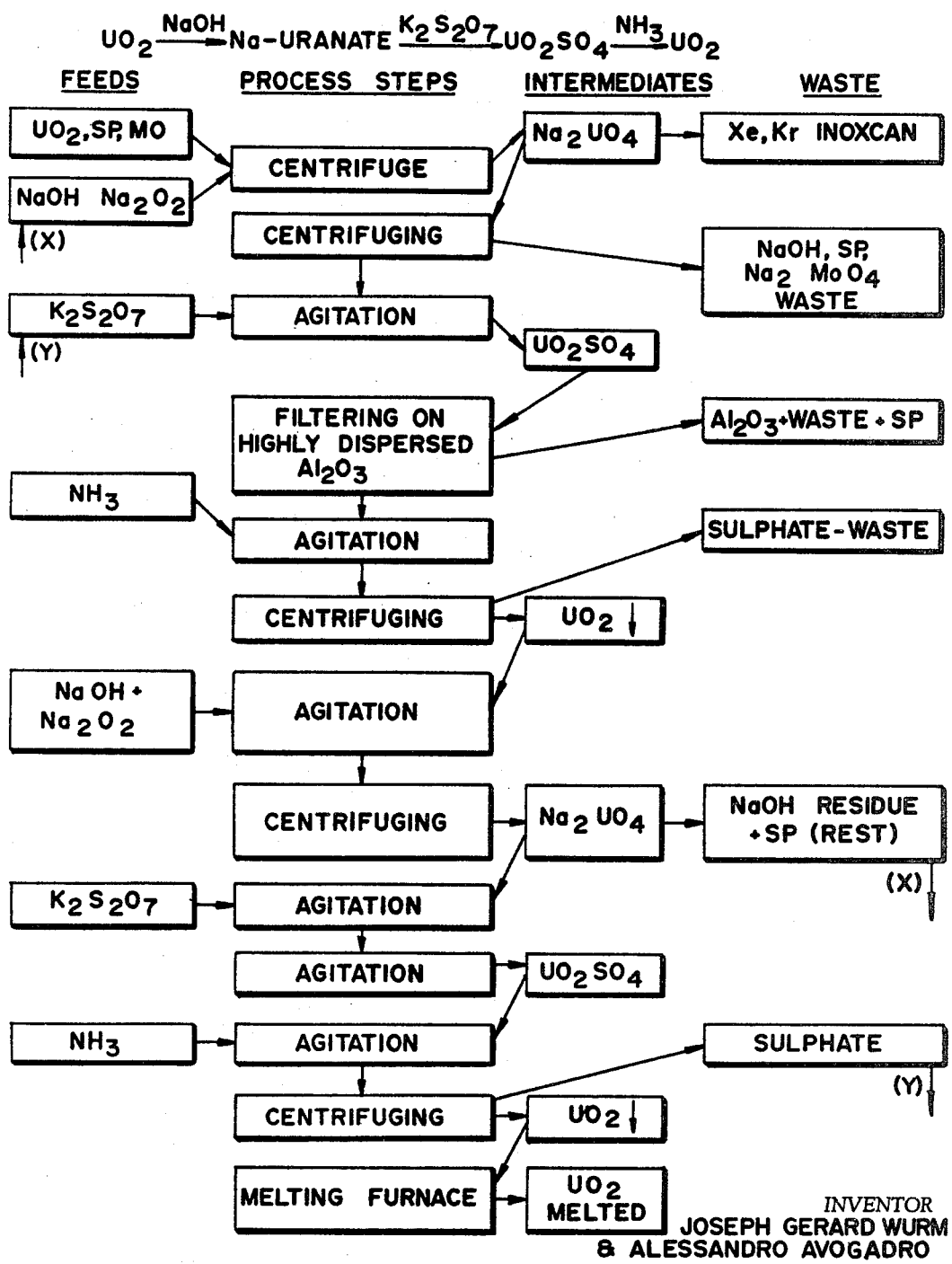

Uranium carbide base fuel elements can be similarly processed after a preliminary treatment to convert to an oxide form.

The invention relates to a dry process for processing irradiated ceramic reactor fuels, more particularly those on an oxide and/or carbide base.

Various fast reactors using metal fuel elements are being converted to partly enriched $UO_2$ fuel elements or cermets on a $UO_2$ base with an Inox steel can. Another fast breeder originally planned to use a U-Nb alloy as fuel, is now being designed for $UO_2$-$PuO_2$ fuel elements. There are also plans to use $UO_2$-Mo-cermet or $UO_2$-$ZrO_2$ or $UO_2$-BeO. The main fuels for fast breeders will therefore in the immediate future probably comprise $UO_2$, $PuO_2$ and $ThO_2$ possibly with a stainless steel or Zircaloy fuel element can. The remarkable properties of uranium carbide as a ceramic fuel may at some later date make uranium carbide very important, but at present $UO_2$ technology is much further developed than UC technology.

However, this stage of development has not been reached by dry processes for reprocessing $UO_2$; these processes are nothing like as highly developed as are uranium metal reprocessing processes. Nuclear fuel reprocessing processes operating in the aqueous phase are usually used when high decontamination is required. Unfortunately, because of damage to the solvents by irradiation such processes require a very long cooling time which may run into months. The "immobilized" fuel therefore increases fuel cycle costs.

The furthest developed prior art dry processes are pyrometallurgical processes and the halides distillation method. Other processes have been suggested but have not yet got beyond the laboratory stage.

The halides distillation method is a universal dry process which may be used for all kinds of fuel-metallic, ceramic ($UO_2$ and UC) and cermets (except for thorium). The process is not entirely satisfactory on account of the expensive plant investment, the equipment for remotely controlled fluoridication, operating difficulties, and the high costs for the fluorine and achieve a relatively high decontamination factor which comes near the figure of the aqueous process. However, a low decontamination factor of the order of 100 is considered satisfactory for fast reactor fuel cycles, and so a simpler short-cycle dry method would be preferable, even if it did not reach a high decontamination factor.

The pyrometallurgical method is proposed for a special purpose-reprocessing U-fissile metal fuel. The method has been in the development stage since 1955 but since 1955 interest in metallic fuels has waned considerably and ceramic fuels have attracted much increased attention. Endeavors are therefore made to convert the UC or $UO_2$ into uranium metal by reduction with liquid Zn-Mg mixtures. After the fission products have been removed, the metal is reconverted back to UC by passing propane gas through the liquid alloy, or alternatively the metal is oxidized in a solid/liquid reaction with ZnO. This process has its technological difficulties, requiring a large hot cell and an argon atmosphere for its performance.

A "short" fuel cycle for fast reactors must meet the following basic reprocessing problems. First, the fissile material ($U^{235}$, $Pu^{239}$, $Pu^{241}$), the costly ingredient of nuclear fuel in the reactor core, must be separated from the fertile material ($U^{238}$, $Pu^{240}$), and second the fission products, the metals (as a rule Mo or Nb) allowed with the fuel, the heat vehicle (sodium metal) and the canning material (Inox steel, Zircaloy and so on) must be isolated and separated from one another. A problem with regard to the fertile shell is to separate the bred fissile material $Pu^{239}$ and $Pu^{241}$ from fertile $U^{238}$.

In the dry reprocessing of $UO_2$ the development of the physical and chemical state of the fission products must be known accurately, as must also the chemical reactions which may occur between the fission products and the fissile or fertile material. This problem is insignificant in aqueous reprocessing processes since the acid disintegration causes a complete chemical conversion. The way in which the fission products react in dry processes with one another and with the fuel or breeder material has been neglected so far, but for a dry reprocessing process endeavoring to retain or to change little of the oxidation stage of uranium it is important to know which permanent solutions or chemical compounds, the $UO_2$, $PuO_2$ and fission products can enter into with one another in reactor operation conditions.

It is an object of this invention to reduce the time and cost of the fuel cycle for $UO_2$ or UC operated reactors.

In its broad form the invention provides a process for reprocessing irradiated ceramic reactor fuels, more particularly those of an oxide or carbide base which is characterized in that the fuel for processing (e.g., cut up fuel elements) is digested in a basic molten alkali compound or compounds in the presence of an oxidizing agent whereby the fuel is converted into an alkali uranate which is produced in powder form and is insoluble in the melt, the alkali uranate powder is removed from the melt (e.g., by filtering separately from at least some of the fission products or other impurities, the uranate is converted in a melt of aluminum halides or aluminum sulfate or alkali disulfate or alkali pyrosulfate or ammonium disulfate or ammonium pyrosulfate or a mixture of two or more of these salts into a uranyl salt or salts and the uranyl salt (or salts) is reduced to uranium dioxide which is separated from the salt melt.

Preferably the first said melt is treated, after removal of the alkali uranate powder, with $Al_2O_3$, $SiO_2$ or other oxide-containing compounds to convert fission products dissolved in the melt into insoluble form.

In the complete process according to the invention in a more specific form, the fuel for processing or a cut up fuel element is digested in basic molten alkali compounds in the presence of oxidizing agents, whereby the fuel is converted into an alkali uranate in powder form insoluble in the melt, the fission gases (i.e., Kr and Xe) are evolved and the parts of the fuel element cans are removed from the melt. The powdery alkali uranate is thereafter recovered from the liquid melt, for instance by filtering through porous graphite or by centrifuging, and the filtrate containing the fission products soluble therein and possibly other elements deriving from the fuel matrix, such as molybdenum or columbium in dissolved form, is treated with $Al_2O_3$, $SiO_2$, or other oxide-containing additives, possibly in the form of sand and kaolin, to convert such fission products into a solid water-insoluble readily handleable cement-like form of solid waste, the substantially decontaminated alkali uranate evolved in the disintegration of ceramic nuclear fuels by an oxidizing alkali melt is converted by melting in aluminum halides or in aluminum sulfate or in alkali disulfates or in alkali pyrosulfates, ammonium disulfate or ammonium pyrosulfate or in mixtures of these salts into uranyl salts (halides or sulfate), and uranium dioxide which can be reconverted to the fuel cycle is separated, by reduction by ammonia and/or hydrogen, from the uranyl salts present in the salt melt solution, filtered off, and possibly further processed.

In preferred working conditions of the invention, the melt is a hydroxide of the alkali metals or a mixture of hydroxides thereof, the oxidizing agent is air or pure oxygen or sodium peroxide, working is performed at temperatures of from 350° to 400° C. or 450° C., and carbonate and nitrate additions are made to the alkali metal hydroxide melt. According to another preferred feature of the invention, the uranium dioxide obtained by the process is further processed in accordance with the conventional technological processes of fuel element preparation. Another preferred feature of the invention resides in a special further processing of the uranium dioxide obtained in accordance with the invention, viz that the uranium dioxide make a repeated passage through all the stages of the process according to the invention. According to yet another preferred feature of the invention, the filtrates or centrifuged discharges arising in the various stages of the whole process are returned to appropriate earlier stages of the process. Aluminum oxide produced in the conversion from alkali uranate into uranyl salts in aluminum salt melts may be separated from the melt before the uranyl salts are reduced to uranium dioxide. Highly dispersed adsorbents which adsorb fission products in known manner, such as aluminum oxide, silica gel, kaolin or the like, may be added to the uranyl salt melt and separated from the melt before the reduction to $UO_2$. The process according to the invention will be called hereinafter the Sodex process.

From the process point of view, the alkali melt treatment of the fuel for reprocessing is very simple. The fuel merely changes its oxidation stage from IV to VI, which facilitates reconversion to $UO_2$, without the halogenation and dehalogenation reaction, or the reduction and oxidation reactions which are required by the prior procedures. An advantage of the process according to the invention over the known processing processes is that the fuel is completely broken up to powder, and so it becomes a simple matter to separate the fission gases, for instance, in vacuo. Also, the fuel element can parts can be separated without chemical attack from the fuel and from the alkali melt, for instance by the uranate powder and the melt being passed through a coarse screen.

The alkali uranate formed is insoluble in the alkali melt whereas almost all the fission products except the rare metals dissolve. For instance, caesium, barium, strontium, zirconium, ruthenium (in the form of ruthenate), tin, antimony and tellurium are completely soluble, and lanthanum and cerium are partly soluble, in molten NaOH.

An example will now be given in order to explain the invention more fully and to give a quantitative idea of the efficiency of the process in the disintegration stage.

Irradiated $UO_2$ (burn-up 3%) is treated with 40 g. of NaOH, the proportion of $UO_2$ to NaOH being 3%, in the presence of 1 g. of $Na_2O_2$ in a nickel crucible at 500° C. for 4 hours, whereafter filtering is performed at 500° C. through porous graphite (Union Carbide) and 0.9022 g. of the filtrate is analyzed by gamma-spectroscopy. The fission product activity so measured shows that the following fission products, which were originally contained in the $UO_2$ specimen, are now present in solution in the NaOH melt separately from the $UO_2$. The percentages denote the percentage of the products in solution of the corresponding fission products in the $UO_2$ specimen.

| | Percent |
|---|---|
| Zr-Nb | 99 |
| Ce | 95 |
| Ru | 90 |
| Ba | 98 |
| La | 95 |

These values are mean values derived from a number of experiments on the same batch.

The formation of sodium uranate is complete in an NaOH melt when working at temperatures of from 350° to 400° C. Uranate formation is incomplete at 300° C., and at temperatures of 350° and 400° C., $UO_2$ cannot be detected by X-rays. The solubility of the alkali uranate in NaOH-LiOH is on the average 500 p.p.m. U; the sodium uranate is the substance which forms preferentially in NaOH-LiOH.

Plutonium forms insoluble plutonate in the oxidizing alkali melt and therefore remains in the reconversion cycle. The melt containing the fission materials can be mixed with $Al_2O_3$ and $SiO_2$ or other oxides, in the form of sand or kaolin, in which event water-insoluble cement-like aluminosilicates are formed. The result is very economical isolation and preservation of the fissile materials since there is no evolution of liquid radioactive waste.

After the disintegrating or dissolving stage of the Sodex process, the next step is to convert the relatively weakly contaminated alkali uranate into uranium dioxide. For instance, the Sodex process can develop in accordance with the following chain of equations:

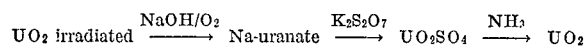

The uranate to uranyl salt conversion step can proceed, for instance, in accordance with the following equation:

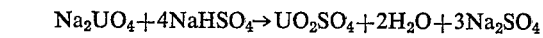

If working is effected in an ammonium disulfate melt, then:

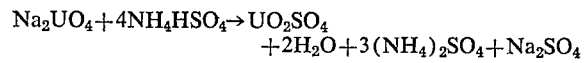

In both cases there is complete dissolution of sodium uranate at temperatures of from 400° to 500° C., a completely soluble uranyl sulfate being formed. The disulfate melt turns a greenish-yellow color characteristic of uranyl salts. However, unless increased dilution is required the temperature must be higher for working with disulfates, since there is an increasing formation of sodium sulfate which has a higher melting point. It is better to work with potassium pyrosulfate, since there is no evolution, in the reaction in a pyrosulfate melt, of water which may hydrolyze the uranyl salts at the working temperatures. The solubility of uranyl sulfate in potassium pyrosulfate is approximately of the order of 30% by weight of 500° C. The formation of uranyl sulfate with potassium pyrosulfate proceeds in accordance with the equation:

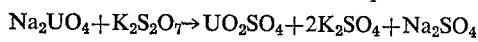

In another form of the invention, working can proceed in an alkali chloride melt, sodium uranate and aluminum oxide being suspended in the melt with an introduction of chlorine. After the sodium uranate has been converted into uranyl chloride, the suspended aluminum oxide is separated, and the step of reducing to uranium dioxide is thereafter performed. This reduction proceeds smoothly at from 550° to 600° C. and starts at a temperature as low as 450° C., but to ensure that the $UO_2$ is obtained in stoichiometric amount, it is better to work at temperatures around 700° C.

Sodium uranate can also be treated in an aluminum chloride melt, uranyl chloride and aluminum oxide being formed. After separation of the aluminum oxide, the step of reducing to uranium dioxide can be performed directly in the melt by an introduction of ammonia.

The reduction of the uranyl salts to uranium dioxide can of course be effected with other reducing agents known for reducing uranyl salts to uranium dioxide. The reduction of uranyl sulfate with ammonia proceeds in accordance with the equation:

$$UO_2SO_4 + 5NH_3 \rightarrow 3UO_2 + N_2 + 3NH_4HSO_4$$

The uranium dioxide obtained by reduction of the uranyl salts has been satisfactorily confirmed by radiocrystallography to be crystallized $UO_2$. For the purposes of a fuel cycle adapted to fast breeders, this uranium dioxide can technically be regarded as free from fission products.

Figure 2:
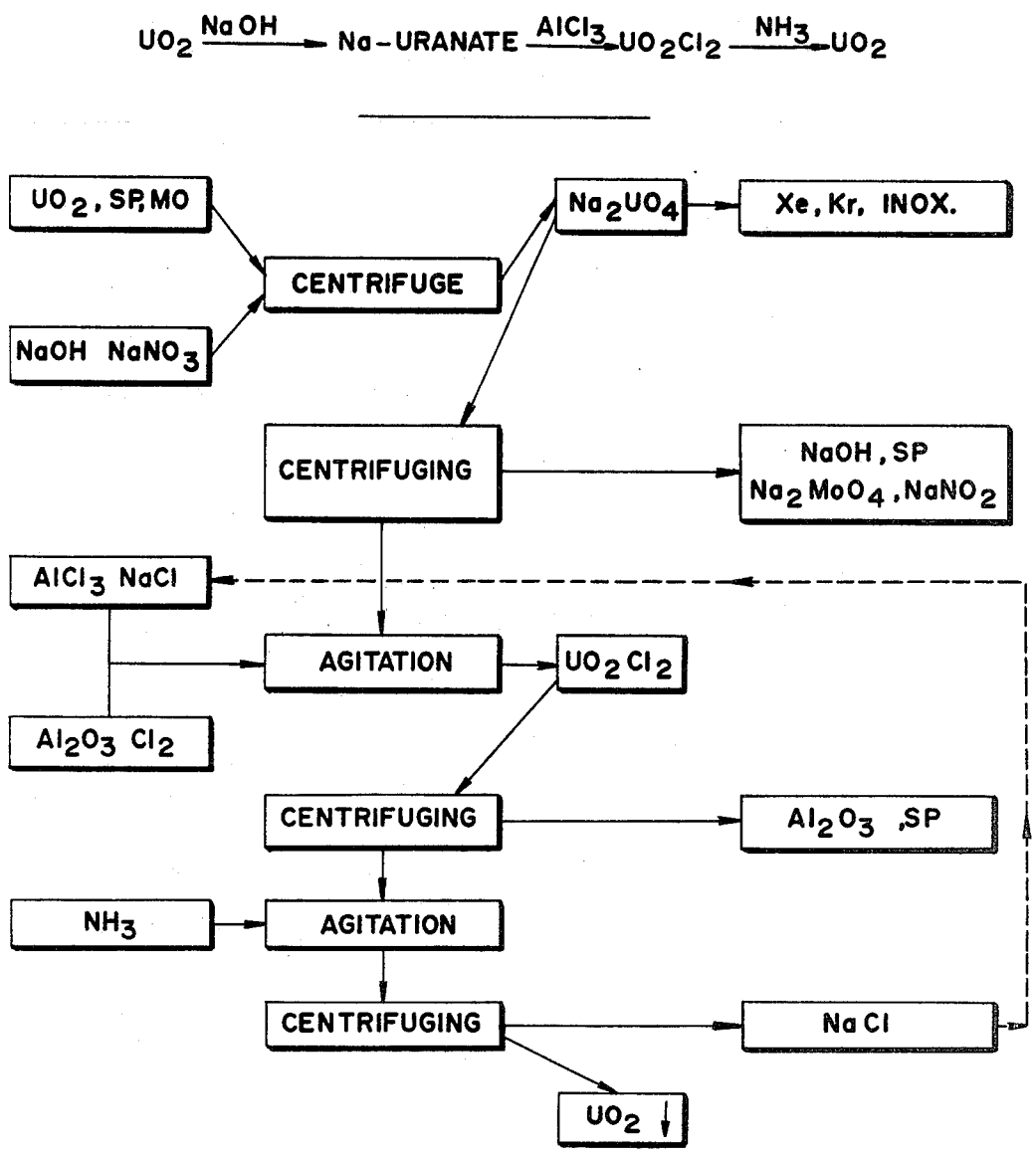

FIGURES 1 and 2 show two flow sheets and working schemes for two practical examples of the Sodex process and they will be taken hereinafter as examples for performance of the whole process.

Fuel elements cut up into cylindrical pieces are introduced, together with their canning materials, into an NaOH melt containing $Na_2O_2$. Chemical attack then takes place from the open ends of the pieces. This process can of course be accelerated by agitation or vibration or other mechanical methods, including possibly the blowing of air through the mix. The melt is then passed through a coarse screen to free it from pieces of canning material, whereafter the sodium uranate, which is yielded in the melt in powder form, is centrifuged or filtered in order to separate it from the melt which contains most of the fission products and molybdate. The insoluble precipitate of sodium uranate in the alkali melt is then further processed by being dissolved with agitation in a potassium pyrosulfate melt in which the sodium uranate is converted into uranyl sulfate, a substance which is soluble in the melt. Once all the sodium uranate has been converted into uranyl sulfate, a small sludgy residue of fission products remains. Highly dispersed aluminum oxide is added to this residue and the mixture is digested and removed by centrifuging or filtering. Ammonia is introduced into the filtrate and the crystallized uranium dioxide which separates out is separated from the melt by centrifuging or filtering. The uranium dioxide thus obtained can be passed through the same cycle again, the relatively weakly contaminated melt waste from the second cycle being returned to appropriate stages of the first cycle, see X and Y of FIGURE 1. In this particular case, the more weakly contaminated melt waste is sodium hydroxide which has sodium peroxide and potassium pyrosulfate added to it before being returned to the first cycle. The highly contaminated sodium hydroxide yielded in the first cycle is combined with the contaminated aluminum oxide yielded and converted into a solid cement-like form of waste by aluminate formation and by addition of silicates or kaolin. The contaminated pyrosulfate filtrate from the first cycle is converted by an addition of lime into a water-insoluble solid waste.

In the first stage of the scheme shown in FIGURE 2, nitrate is added to the dissociating agent for treating irradiated $UO_2$. In other respects the dissociation or disintegration stage is performed in exactly the same way as has been described with reference to FIGURE 1, except that conversion to uranyl chloride is performed in an aluminum chloride-alkali chloride melt. To reduce uranyl chloride, the melt temperature must be increased, aluminum oxide separates out and is removed by filtration before reduction. In this stage, sodium uranate is suspended in an alkali chloride melt and chlorine is introduced, to effect conversion to uranyl chloride. The added aluminum oxide serves as adsorbent. The reduction of uranyl chloride to uranium dioxide then proceeds as described with reference to FIGURE 1. As in the previous case, the process can be repeated several times. The decontamination factors in the various stages of the Sodex process confirm that the fission products are separated in a technically satisfactory manner.

Consequently, the whole cycle of reconverting irradiated $UO_2$ to technically fission-product-free $UO_2$ extends over only two chemical intermediate stages—uranate and uranyl salt. This makes one considerable advantage of the process according to the invention immediately apparent—it is very simple, requires little outlay on equipment and chemicals and, from the point of view of process technique, can even be performed by a one-pot operation, so that first costs as well as process costs can be reduced. It is also a simple and practicable matter for the process according to the invention to be performed close to a reactor; if this is done, the irradiated fuel can be further processed by wet treatment by sending the alkali uranate powder to a further processing plant, which is much simpler, so far as packing, transport and radiation protection are concerned, than dispatching whole irradiated fuel elements. The process according to the invention can process irradiated fuel elements immediately after their removal from the reactor; consequently, the idle times normally associated with the fuel cycle are reduced and the very much less-contaminated alkali uranate yielded in accordance with the invention can be transported and subjected to further processing under simpler and cheaper radiation protection conditions than has previously been possible.

Another advantage of the process according to the invention is that any molybdenum present in the fuel matrix, and it may be present in a proportion of up to 10%, is converted in the oxidizing alkali melt into $MoO_3$; this forms a molybdate which is soluble in the melt and which can therefore be separated.

The crucible used in practicing this invention should be made of a material resistant to corrosion by the oxidizing alkali melt at temperatures up to 1000° C., such as Monel metal, Hastelloy, pyrographite and special nickel steels. The heat evolved by the irradiated fuels also contributes towards maintaining the bath in the molten state. The process according to the invention can also be performed in a simple hot cell without inert gas protection, i.e., for instance in air, and is performed at a relatively low temperature, with a consequent saving in power costs.

The fact that salt melts are substantially resistant to reactor radiation and experience scarcely any structural change leads to another considerable advantage of the process according to the invention, namely that the irradiated fuel can be processed immediately after removal from the reactor, and the long cooling times required for wet processing and arising out of radiolytic disintegration of the solvents disappear, and so the time required for the reconversion cycle is reduced very considerably.

The acid dissociation or disintegration of the uranate proceeds more rapidly than in the case of $UO_2$. Since the $\beta$ and $\gamma$ activity of the alkali uranate obtained by the process according to the invention is very much less than the $\beta$ and $\gamma$ activity of the irradiated fuel element, concentrated solutions can be used without radiolytic disintegration of the solvents.

The process according to the invention can also be used to process uranium carbide provided that the same is first converted into the oxide form.

We claim:

1. A process for treating irradiated ceramic reactor fuel elements, containing uranium carbide or uranium oxide, to recover uranium therefrom, comprising
   (1) digesting said fuel elements with a basic molten alkali compound in the presence of an oxidizing agent whereby the uranium content of said elements is converted into an alkali uranate which is insoluble in the melt, (2) separating the insoluble alkali uranate product from the residual melt containing fission products and other impurities from said fuel elements;

(3) reacting the alkali uranate with at least one compound from the group consisting of aluminum halide, aluminum sulfate, alkali metal disulfate or alkali metal pyrosulfate, ammonium disulfate and ammonium pyrosulfate in molten form whereby said alkali uranate is converted to uranium dioxide; and (4) separating the thereby-produced uranium dioxide from the salt melt, and recovering the same for reuse in ceramic reactor fuel elements.

2. A process as claimed in claim 1 in which the residual melt is reacted with a material from the group consisting of oxides of aluminum and oxides of silicon to convert fission products dissolved in the melt into insoluble solid products.

3. Process as set forth in claim 1, wherein the alkali compound is sodium hydroxide.

4. Process as set forth in claim 1 wherein air or sodium peroxide is used as oxidizing agent.

5. Process as set forth in claim 1, wherein the digestion is performed at temperatures of from 350°–450° C.

6. Process as set forth in claim 1, wherein carbonate and nitrate salts are added to the alkali melt.

7. Process for treating irradiated ceramic reactor fuel elements, containing uranium carbide or uranium oxide, to recover the uranium content thereof, comprising (1) digesting said fuel elements in a melt of a basic alkali compound in the presence of oxidizing agents whereby the uranium in said element is converted into an alkali uranate which is insoluble in the melt;

(2) separating the insoluble uranate from the liquid melt by filtering through porous graphite, (3) adding to the filtrate an oxide of aluminum or silicon, thereby converting fission products in said filtrate into a solid water-insoluble readily handleable cement-like form;

(4) reacting the separated insoluble uranate in a melt composed of at least one compound from the group consisting of aluminum halide, aluminum sulfate, alkali disulfates, alkali pyrosulfate, ammonium disulfate, and ammonium pyrosulfate, thereby forming a uranyl salt;

(5) converting said uranyl salt to uranium dioxide by reduction of ammonia or hydrogen; and (6) recovering the thereby produced uranium dioxide.

8. Process as set forth in claim 7 wherein the basic alkali compound is sodium hydroxide and the uranate is reacted in a melt containing aluminum chloride.

References Cited

UNITED STATES PATENTS 3,322,509   5/1967   Vogg _____ 23—325

FOREIGN PATENTS 1,184,503   12/1964   Germany.
1,197,630   7/1965   Germany.

CARL D. QUARFORTH, *Primary Examiner.*

R. L. GRUDZIECKI, *Assistant Examiner.*